United States Patent [19]

Gilbert

[11] Patent Number: 4,691,610
[45] Date of Patent: Sep. 8, 1987

[54] GUITAR STAND WITH FOLD-AWAY, SUBSTANTIALLY CONCEALABLE LEGS

[75] Inventor: David S. Gilbert, Huntington Beach, Calif.

[73] Assignee: William H. Howard, Newport Beach, Calif.

[21] Appl. No.: 873,800

[22] Filed: Jun. 13, 1986

[51] Int. Cl.[4] ............................................. G10G 5/00
[52] U.S. Cl. .................................... 84/327; 84/453; 248/168; 248/178
[58] Field of Search ................. 84/327, 453; 211/195, 211/199, 203; 248/176, 178, 166–168

[56] References Cited

U.S. PATENT DOCUMENTS

| 2,464,031 | 3/1949 | Fiedel ................................. 248/167 |
| 3,870,263 | 3/1975 | Hardman et al. ................... 248/168 |
| 3,958,786 | 5/1976 | Mann ................................. 84/327 X |

Primary Examiner—Benjamin R. Fuller
Attorney, Agent, or Firm—Klein & Szekeres

[57] ABSTRACT

A guitar stand has a main body or base which forms an interior cavity. An adjustably extendable elongated neck member carrying a 270-degree pivotable yoke, for supporting the neck of a guitar, is mounted into the cavity. The base includes substantially L-shaped extensions forming channels into which foldably extendable legs are mounted. The legs are substantially concealed and non-obtrusive when they are folded away into the channels, as for transportation or storage.

19 Claims, 6 Drawing Figures

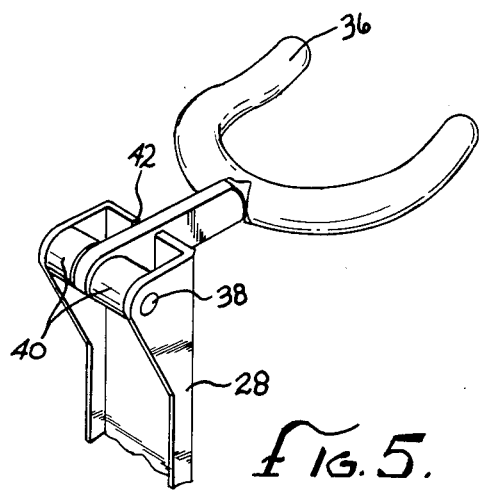
fig.5.
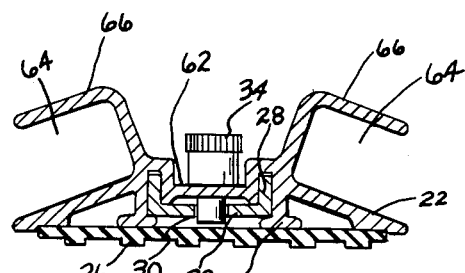
fig.4.
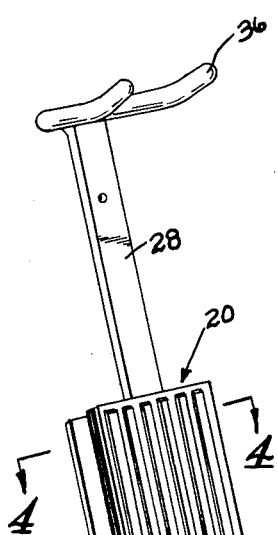
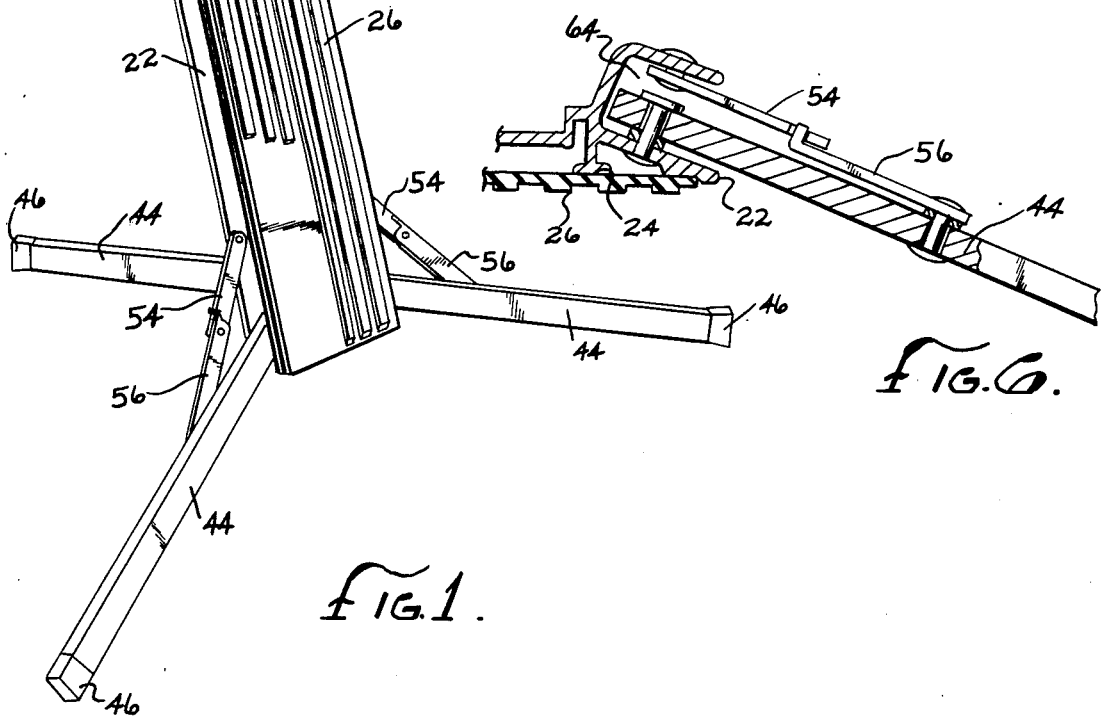
fig.6.
fig.1.

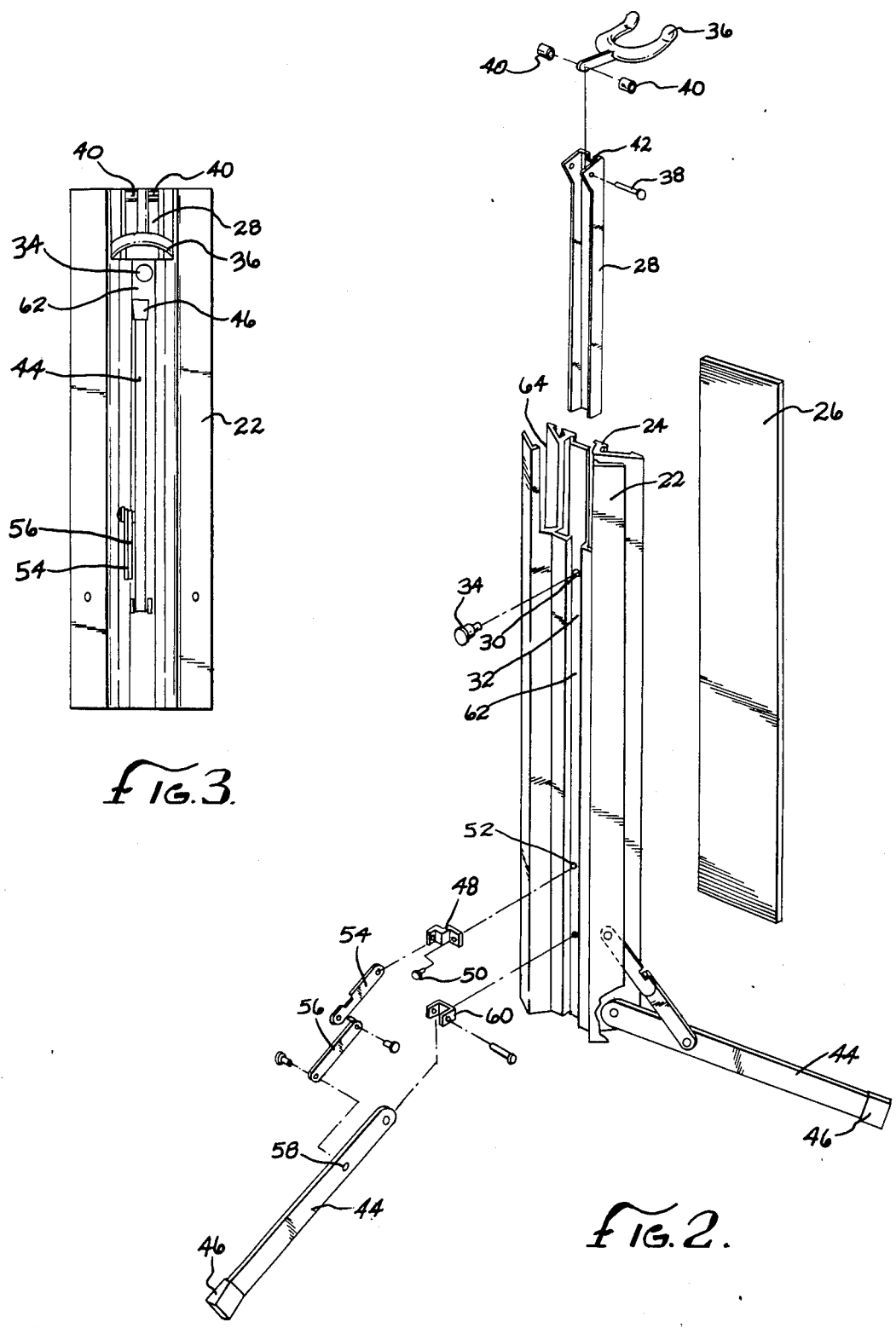

GUITAR STAND WITH FOLD-AWAY, SUBSTANTIALLY CONCEALABLE LEGS

BACKGROUND OF THE INVENTION

1. Field of the Invention

The present invention is directed to a guitar stand. More particularly, the present invention is directed to an improved guitar stand having legs which are unobtrusively placed and substantially concealed when folded away for transportation or storage.

2. Brief Description of the Prior Art

Guitar stands are old in the art. Guitar stands which have fold-away legs, and a yoke to support the neck of a guitar, are also old. However, as it will be readily appreciated by those skilled in the art, as far as guitar stands are concerned, convenience of portability, of storage, and unobtrusive nature and appearance is also of great importance. In this correction the nature of the art still leaves room for improvement, and the present invention provides such an improvement.

SUMMARY OF THE INVENTION

It is an object of the present invention to provide a guitar stand having legs which can be unobtrusively folded away and substantially hidden for transportation and storage.

It is another object of the present invention to provide a guitar stand having a yoke mounted on an adjustably extendable neck member, which yoke and neck member can also be unobtrusively stored for transportation and storage of the guitar stand.

The foregoing and other objects and advantages are attained by a guitar stand having a main body and an elongated neck member mounted for sliding motion in an interior channel formed in the main body. A yoke, adapted for holding the neck of a guitar, is pivotably mounted to the neck member. When it is desired to store or transport the guitar stand, the yoke is pivoted backward on the neck member and the neck member is placed in the interior channel.

A plurality of legs are pivotably mounted to the main body. When the legs are extended, they support the guitar stand on a support surface, such as the floor. The main body includes a plurality of channels which receive and substantially conceal at least some of the legs when the legs are folded for transportation or storage.

The objects and features of the present invention are set forth in the appended claims. The present invention may be best understood by reference to the following description, taken in connection with the accompanying drawings, in which like numerals indicate like parts.

BRIEF DESCRIPTION OF THE DRAWINGS

FIG. 1 is a perspective view of the preferred embodiment of the guitar stand of the present invention, the view showing the legs, the neck, and the yoke in extended positions;

FIG. 2 is an exploded perspective view of the preferred embodiment;

FIG. 3 is a plane, back view of the preferred embodiment, showing the same in a folded away position;

FIG. 4 is a cross-sectional view of the preferred embodiment, the cross-section being taken on lines 4,4 of FIG. 1;

FIG. 5 is an enlarged partial view showing the yoke of the preferred embodiment, and FIG. 6 is a view showing mounting of the leg to the base or main body of the preferred embodiment.

DESCRIPTION OF THE PREFERRED EMBODIMENT

The following specification taken in conjunction with the drawings set forth the preferred embodiment of the present invention. The embodiment of the invention disclosed herein is the best mode contemplated by the inventor for carrying out his invention in a commercial environment, although it should be understood that several modifications can be accomplished within the scope of the present invention.

Referring now to the drawing Figures, the preferred embodiment of the guitar stand 20 of the present invention is disclosed. As is best shown on the perspective views of FIGS. 1 and 2, the guitar stand 20 includes a main body or base 22. The main body or base 22 preferably comprises extruded aluminum, although it may be made from other materials also. The base 22 has a front side 24 to which a front panel or pad 26 is attached by gluing, fasteners, or other suitable means. The front panel or pad 26 is preferably made of rubber, or relatively soft plastic material. The principal functions of the front panel or pad 26 are to provide a relatively mar-free support surface for a guitar (not shown) and to enclose the interior of the base 22.

Referring still principally to FIGS. 1 and 2, a substantially channel-shaped elongated neck member 28 is shown mounted into the base 22. In the herein-described preferred embodiment, the neck member 28 is made of sheet steel.

In order to slidably accept the neck member 28, the interior of the base 22 has a cavity which is substantially complementary in cross-section to the cross-section of the neck member 28. Thus, the neck member 28 can be moved in and out of the base 22 to extend it as far as it may be desired in view of the height of the guitar (not shown) which is to be supported by the guitar stand 20. The cross-sections of the neck member 28 and of the base 22 are best shown on FIG. 4.

Several means which will become readily apparent to those skilled in the art, may be employed for fixing the neck member 28 in a given desired extended position. In the herein-described preferred embodiment 20, a plurality of holes (not shown) are drilled in the neck member 28, and another hole 30 is provided in a panel 32 of the base. A peg or plunger 34 is then engaged in the hole 34 and is also engaged in the selected matching hole (not shown) of the neck member 28 to hold it in the desired extended position.

Referring now principally to FIGS. 1, 2, and 5, a yoke 36 is shown pivotably mounted by a pin 38 to the end of the neck member 28. A pair of spacer-washers 40 center the yoke 36 on the pin 38. A notch 42 provided in the neck member 28 permits placement of the yoke 36 in the forward position shown on FIGS. 1, 2, and 5. As it will be readily understood, when the stand 20 is utilized to support a guitar (not shown), the yoke 36 is in the forwardly pivoted position shown on FIGS. 1, 2, and 5. The drawings also reveal that the yoke 36 can be pivoted "back" approximately 270 degrees. This is done for transportation and storage; the yoke 36 is shown in the "pivoted back" (folded away) position on FIG. 3.

Referring now again principally to FIGS. 1 and 2, three legs 44 of the guitar stand 20 are shown, extended in the positions wherein they normally support the guitar stand 20 on a support surface, such as a floor (not shown). In the herein-described preferred embodiment, each leg 44 is made of bar stock, and has a friction-fitted plastic or like cap 46 at the one end which normally comes into contact with the floor (not shown).

The manner of pivotably mounting the center leg 44 to the base 22 is best shown on FIG. 2. A bracket 48 is attached with a rivet 50 to an aperture 52 placed in the base 22. A hinge plate 54 is secured to the bracket 48, and a hinge lock plate 56 is mounted to the hinge plate 54. The remote end of the hinge lock plate 56 is mounted to an aperture 58 placed in an intermediate portion of the leg 44. The end of the leg 44 is secured to the base 22 by a second bracket 60. The brackets 48 and 60, as well as the hinge plate 54 and hinge lock plate 56, comprise mounting hardware of the type which is well known in the art, and therefore need not be described here in further detail.

The two side legs 44 of the guitar stand 20 (other than the center leg 44, the mounting of which was just described above) are also attached to the base 22 by a hinge plate 54 and a hinge lock plate 56. However, the use of brackets for this attachment is not necessary. This is best illustrated on FIG. 6 of the drawing.

It is an important novel feature of the guitar stand 20 of the present invention that when the legs 44 are folded away for transportation or storage, then they are disposed in a non-extending, non-obtrusive and, as far as the side legs are concerned, in substantially concealed positions. To this end, the center leg 44 is received and stored in its folded-away position in a center channel 62 formed in the back of the base 22. The two side legs 44 are received and substantially concealed for storage in channels formed by substantially L-shaped extensions of the base 22. The L-shaped extensions comprise integral parts of the base 22 and are best shown on FIG. 4. The back of the guitar stand 20 in its folded-away position is shown on FIG. 3, with the folded-away side legs being substantially hidden, and the folded-away center leg being non-obtrusive. In this position of the stand 20, adapted for transportation or storage, the neck member 28 is also stored and substantially concealed within the interior cavity of the base 22.

Advantages of the above-described guitar stand include its ease of construction, and ready adaptability for transportation and storage in a neat and non-obtrusive manner.

Several modifications of the above-described guitar stand may become readily apparent to those skilled in the art from the foregoing disclosure. Therefore, the scope of the present invention should be interpreted solely from the following claims.

What is claimed is:

1. A guitar stand comprising:
a main body;
a yoke adapted for holding the neck of a guitar;
an elongated member mounted for sliding motion relative to the main body, the yoke being pivotably mounted to the elongated member;
a plurality of legs foldably mounted to the main body and thereby comprising means in their extended position for supporting the guitar stand;
first channel means incorporated in the main body for receiving and substantially concealing the legs when said legs are folded, and
second channel means incorporated in the main body for receiving and substantially concealing the elongated member when the elongated member is not extended relative to the main body.

2. The guitar stand of claim 1 wherein the yoke is capable of approximately 270 degree pivoting motion relative to the elongated member.

3. The guitar stand of claim 1 having three legs.

4. The guitar stand of claim 1 wherein the elongated member is adjustably extendable in increments relative to the main body.

5. The guitar stand of claim 1 wherein the elongated member is a substantially channel-shaped member and wherein the main body includes an internal channel adapted for receiving the member, the internal channel comprising the second channel means.

6. The guitar stand of claim 1 wherein the main body includes two substantially L-shaped extensions, each of the extensions forming a channel, each of said channels comprising part of the first channel means.

7. The guitar stand of claim 1 wherein the first channel means include a central channel formed in the main body.

8. A guitar stand comprising:
a main body;
a pad mounted to a front side of the main body and enclosing an interior channel in the main body;
an elongated member extendably mounted to the main body and capable of being placed and substantially concealed within the interior channel of the main body;
a yoke pivotably mounted to the elongated member and adapted for holding the neck of a guitar;
at least three legs pivotably mounted to the main body, the legs being extendable to support the guitar stand on a support surface such as the floor, and whereby the legs can be folded into a non-extended position, and
channel means incorporated in the main body for receiving the legs in their folded positions and substantially concealing the legs.

9. The guitar stand of claim 8 wherein the yoke is mounted for approximately 270 degrees of pivoting motion relative to the elongated member and wherein the yoke can be pivoted backward on the elongated member to be accepted in the interior channel together with the elongated member.

10. The guitar stand of claim 8 wherein the main body includes two substantially L-shaped extensions extending toward the back of the main body, the L-shaped extensions being comprised in the channel means.

11. The guitar stand of claim 8 wherein the main body is comprised of extruded aluminum.

12. The guitar stand of claim 8 wherein each leg is mounted to the main body by a foldable hinge.

13. The guitar stand of claim 8 wherein the pad is comprised of rubber.

14. The guitar stand of claim 8 wherein the yoke is mounted for approximately 270 degrees of pivoting motion relative to the elongated member and wherein the yoke can be pivoted backward on the elongated member to be accepted in the interior channel together with the elongated member and wherein the main body includes two substantially L-shaped extensions extending toward the back of the main body, the L-shaped extensions being comprised in the channel means.

15. In a guitar stand having a main body, an elongated member mounted to the main body for adjustably extending therefrom, a yoke pivotably mounted to the elongated member, and a plurality of legs mounted to the main body for supporting, in their extended positions, the guitar stand on a support surface, the legs also being pivotable relative to the main body so as to occupy a substantially non-extended position suitable for transportation and storage, the improvement comprising:
- a plurality of channels incorporated in the main body for receiving and substantially concealing at least two of said legs when said legs are disposed in the substantially non-extended positions;
- a pad member attached to the main body; and
- an internal channel formed within the main body and substantially concealed by the pad member, the internal channel comprising means for receiving and substantially concealing the elongated member when the elongated member is substantially non-extended relative to the main body.

16. The improvement of claim 15 wherein the yoke is pivotable backward on the elongated member.

17. The improvement of claim 16 wherein the main body comprises two substantially backwardly directed, substantially L-shaped members, each of the L-shaped members forming one of said channels of the main body.

18. The improvement of claim 17 wherein the elongated member is a substantially channel-shaped body and wherein the internal channel is substantially complementary in configuration to the channel-shaped body.

19. The improvement of claim 18 wherein the main body further comprises a central open channel formed in the back of the main body, the central channel a third leg of the stand, when said third leg is in a substantially non-extended position.

* * * * *